US005975485A

United States Patent [19]

Tsai et al.

[11] Patent Number: 5,975,485

[45] Date of Patent: Nov. 2, 1999

[54] INTEGRATED MICRO THERMISTOR TYPE FLOW CONTROL MODULE

[75] Inventors: Ming-Jye Tsai, Chang Hua; Min-Chieh Chou, Taipei, both of Taiwan

[73] Assignee: Industrial Technology Research Institute, Hsinchu, Taiwan

[21] Appl. No.: 09/026,154

[22] Filed: Feb. 19, 1998

[30] Foreign Application Priority Data

Oct. 16, 1997 [TW] Taiwan ................................ 86115177

[51] Int. Cl.[6] ................................................ F16K 31/02

[52] U.S. Cl. .......................................... 251/11; 251/129.06

[58] Field of Search ................................ 251/11, 129.06, 251/129.01, 331

[56] References Cited

U.S. PATENT DOCUMENTS 5,058,856 10/1991 Gordon et al. ............................ 251/11

5,323,999 6/1994 Bonne et al. ............................ 251/11

5,529,279 6/1996 Beatty et al. ............................ 251/11

5,785,295 7/1998 Tsai ................................ 251/129.06 X

*Primary Examiner*—Kevin Lee

*Attorney, Agent, or Firm*—Smith, Gambrell & Russell

[57] ABSTRACT

An integrated micro thermister type flow control module in which, when a fluid enters the integrated module past a fluid channel and a suspended microstructure into a thermally-driven microvalve zone, the latter utilizes heat actuation to drive a silicon microbridge with mesa to open a linear proportional flow microvalve. A thermister type flow sensing unit is disposed in the fluid channel to sense the flow amount. The sensing unit is synchronously made with the microvalve and the silicon microbridge structure in an integration process so as to reduce manufacturing steps and minimize the size of the module.

29 Claims, 8 Drawing Sheets

INTEGRATED MICRO THERMISTOR TYPE FLOW CONTROL MODULE

BACKGROUND OF THE INVENTION (a) Field of the Invention

The present invention relates generally to a microflow controller, and more particularly to an integrated thermister type flow control module.

The present invention is applicable for use on all kinds of microflow control apparatus. For instance, the present invention is particularly adapted to couple with microvalves and to be synchronously manufactured therewith on the same substrate. The present invention is also particularly adapted for use in micro control of gases.

(b) Description of the Prior art

A study of the microflow elements and systems made using existing micromachining techniques shows that they are characterized in their capability to precisely sense and control micro amounts of fluid. In general, for gases, the amount of flow controlled is below 1 l/min. For liquids, it is about $\mu$l/min. Aside from being capable of precisely sensing and controlling micro amounts of fluid, the microflow elements and their systems have the advantages of power economy, quick response time, and compactness. Furthermore, due to the characteristics of micro manufacturing techniques, different sensors, actuators, and control circuits can be integrated on the same chip. Therefore, they can provide systematic, multi-functional, and even intelligent microflow system modules within very small units. The microflow elements can also be assembled in arrays to achieve precision control of larger flows. At present, the application of microflow mechanical devices has possibly replaced traditional precision flow control elements in part or made it possible to develop compact fluid sensors. In the future, when the development of micro manufacturing techniques and sensors has become more mature, the applications of microflow will be more comprehensive and become multi-functional and intelligent, which will then have a huge impact on industries.

In U.S. Ser. No. 08/667,906 filed on Aug. 27, 1996 by the applicant of the present invention, various prior art techniques concerning microvalves have been generally discussed. These prior art techniques include U.S. Pat. Nos. 5,142,781, 5,180,623, 5,058,856, 5,271,597, 5,259,737, and 5,429,713, as well as the papers entitled "Microflow Devices and Systems" (pages 157–171, Micromech. Microeng. published by IOP, U.K. in April 1994) and "Integrated Microflow Control Systems (pages 161–167, Sensors and Actuators, The Netherlands, 1990). T. Lisec et al. have also discussed thermal buckling control of microvalves on pages 13–17 of IEEE, 1994.

The present invention is the applicant's continued study on micromachining to further exploit the advantages thereof.

In today's precision analysis instruments and semiconductor manufacturing equipment, mass flow controllers (MFC) are often used to provide precision control of gas flow. The components of MFC include independently made precision control valves, flow sensors and system controllers. Electromagnetic or piezo-electric valves are generally used as precision control valves, whereas capillary heating type flow sensors are used as sensors. Since all components are made by ultra-precision machining techniques and finished by employing mechanical sealing techniques, the parts of the entire system are many and complicated. Assembly is difficult and manufacturing cost is therefore high.

SUMMARY OF THE INVENTION

A primary object of the present invention is to provide an MEMS-based integrated microflow control system module utilizing micromachining techniques and microflow system techniques to replace conventional precision control valves and flow sensors.

Another object of the present invention is to provide a compact and very reliable integrated micro thermister type flow control module which is inexpensive to manufacture and has a relatively large dynamic control range.

A further object of the present invention is to provide an integrated micro thermister type flow control module in which the microvalve and flow sensor thereof are synchronously manufactured during the integration process.

In order to achieve the above-mentioned objects, the integrated microflow control module of the present invention is comprised of three layers of laminate structures connected together and has a proportional microvalve and a sensor unit to execute flow control. The sensor unit utilizes thermal resistance characteristics to sense flow values. Fluid enters from an inlet end at the uppermost or lowermost layer, passes firstly through a fluid channel and is then guided to a suspended micro structure. Finally, the fluid enters a thermally-driven microvalve zone. The microvalve zone mainly utilizes such thermal drive as thermal buckling or thermal bimetal, or electrostatic or electromagnetic methods to drive a silicon microbridge with mesa. The microbridge has the functions of normal close and is capable of being driven open with the external voltage proportion. The present invention utilizes integrated micromachining to manufacture both the microvalve and the microflow sensor at the same time although they have different functions. The present invention reduces the number of processing steps and simplifies assembly. Besides, the microflow control module of the invention is highly reliable, inexpensive, and compact. In the future, the present invention can be used in precision gas flow control required in precision analysis instruments and semiconductor manufacturing equipment.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

In the module of the present invention, fluid enters from the inlet at the upper or lower layer, and passes a microflow sensing zone which is restricted in the microflow channel defined by the upper and lower layers. The channel has an internal diameter of about 400 $\mu$m. The sensor element comprises of a suspension which is comprised of a silicon film and precipitated or driven-in thermally resistant materials. The purpose of providing a suspension is to reduce heat conduction effects. The principle of flow sensing is that when the thermally resistant material at the intermediate layer is heated and the fluid flows, the thermally resistant material upstream and downstream will sense the change in temperature and then output a signal of resistance change. Certainly, it is not necessary to adopt a three-unit structure. One, two or multiple units will also do, depending on the means of external circuit control. The fluid continues to flow to the microvalve zone, which is mainly comprised of a mesa microbridge structure (generally of a thickness about 10 $\mu$m), with precipitated or driven-in thermally resistant material on the microbridge structure. When supplied with external electric currents, the microbridge structure will be heated and deflect in shape. Heating materials are generally polysilicon or bimetal or other metal material such as platinum (Pt) or Tungsten (W). The thermally-driven microstructure cooperates with a projection at the outlet of the valve nozzle so that when the microbridge structure initially generates micro deflection and becomes arched, it may achieve upward deflection and larger linear deflection. Therefore, when not supplied with external electric currents, the microstructure will not deflect so that the fluid fills the interior of the module unit. At the same time, the flow sensing zone will not detect any change in flow. When supplied with external electric currents, the microstructure is heated and deflect, so that the fluid flows steadily towards the outlet at the lower layer. At the same time, the flow sensing zone will detect the change in flow.

Figure 1:
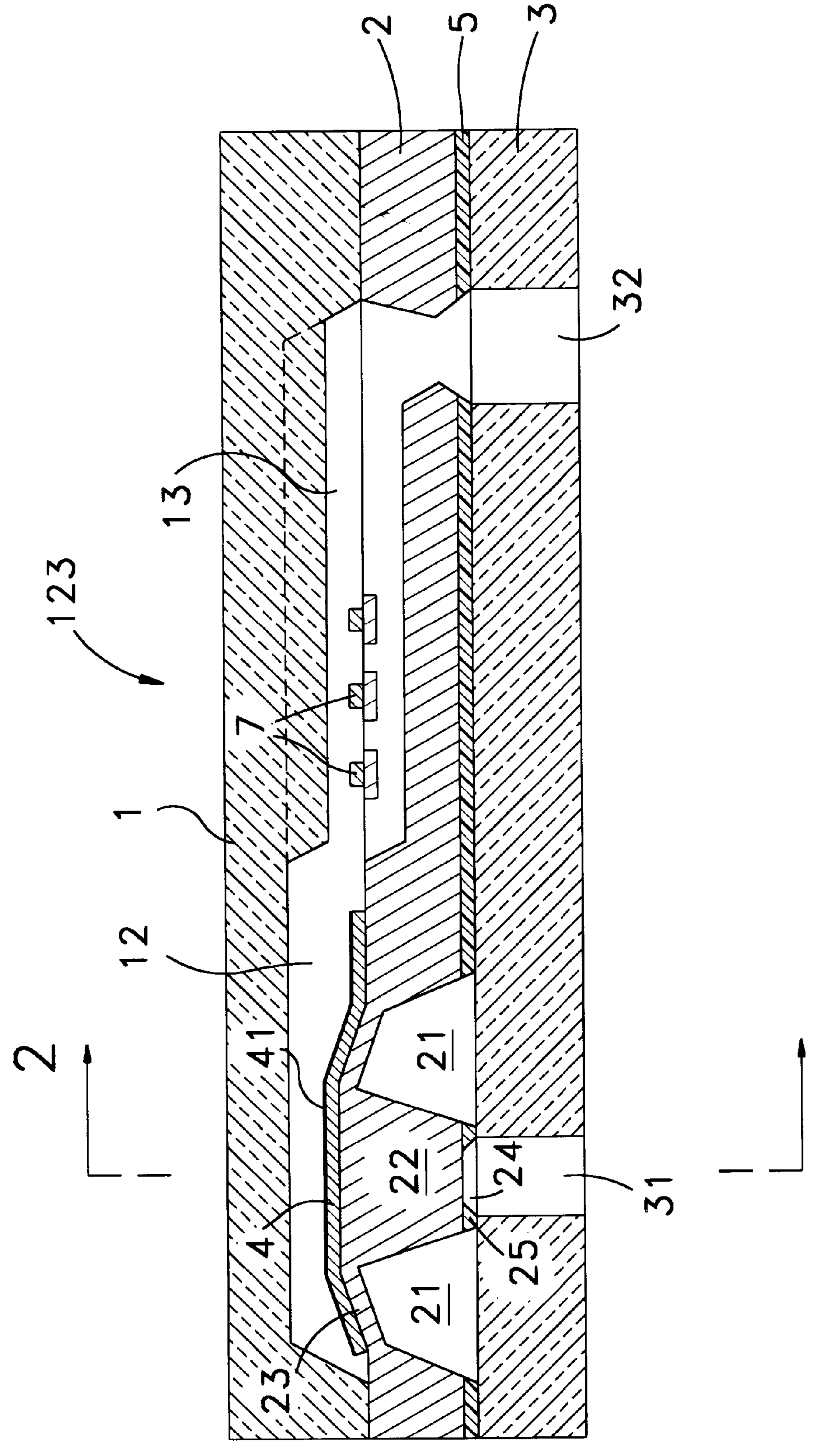
FIG. 1 is a sectional view of a first preferred embodiment of the integrated micro thermister type fluid control module of the present invention.
Figure 2:
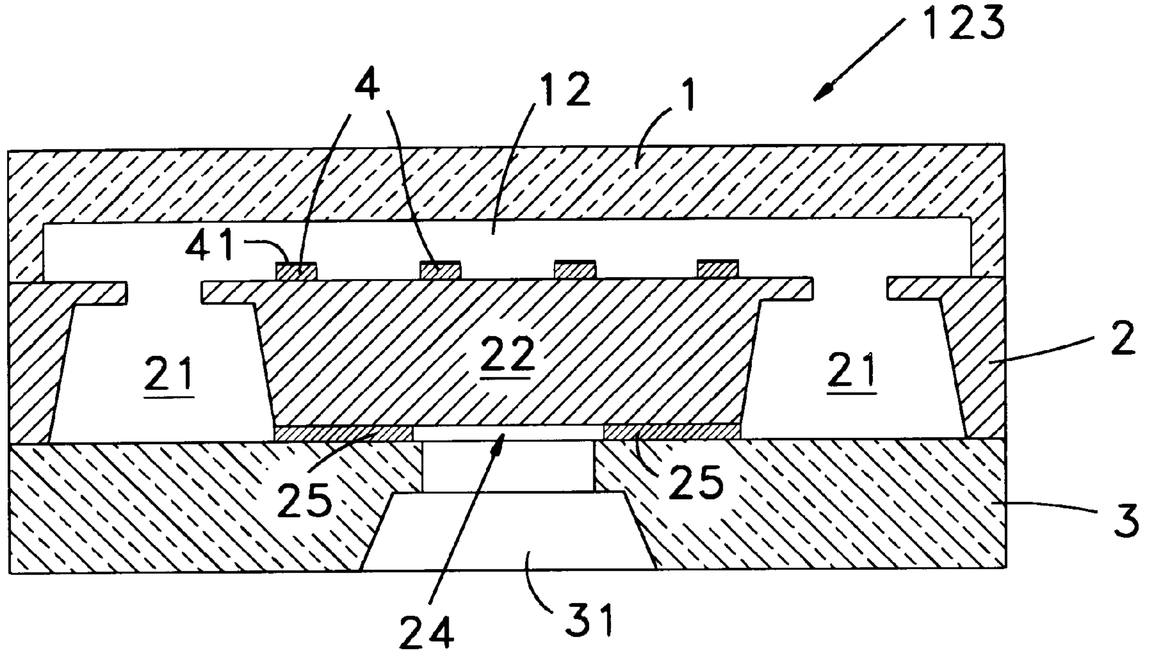
FIG. 2 is a sectional view taken along line 2—2 of FIG. 1.
Figure 2A:
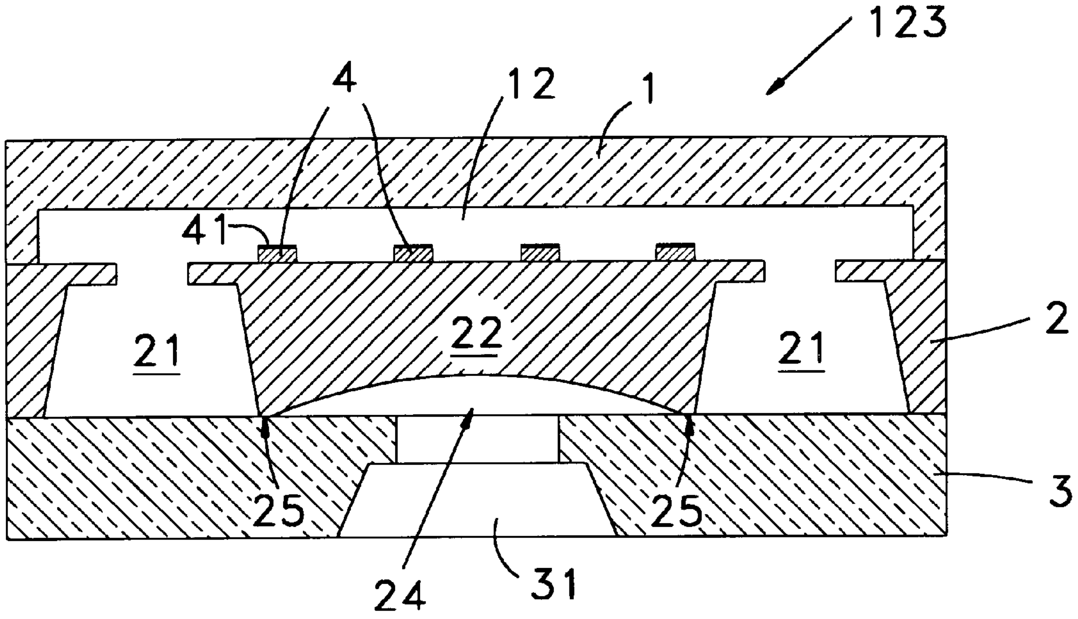
FIG. 2A is similar to FIG. 2, but showing another embodiment of the valve seat.
Figure 3:
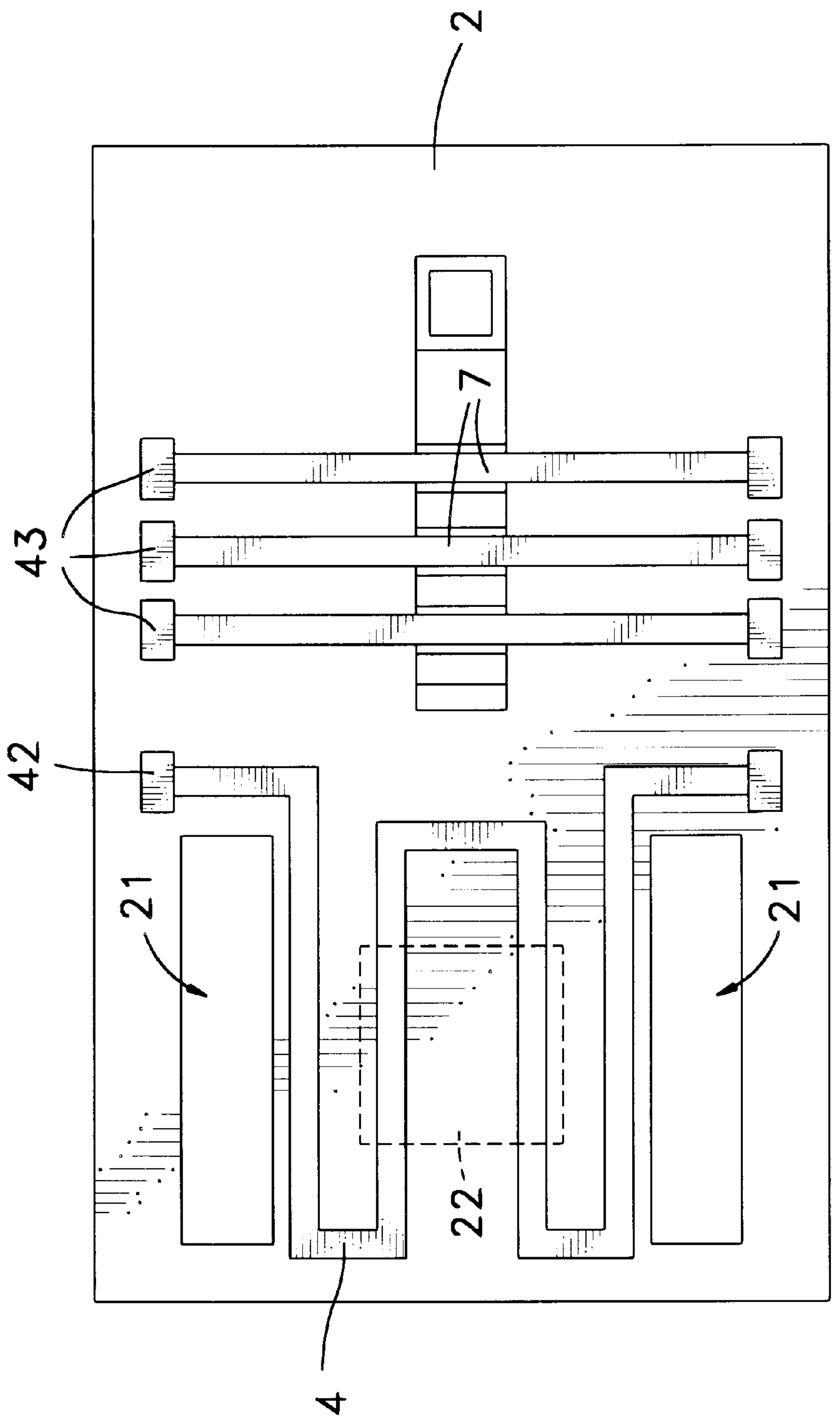
FIG. 3 is a top plan view of the intermediate layer of the invention.

A module 123 shown in FIGS. 1, 2 and 3 comprises an upper layer 1, an intermediate layer 2, and a lower layer 3. The upper layer 1 is preferably comprised of pyrex glass. The intermediate layer 2 has a mesa suspension 22 and a microbridge structure 23. Silicon material can be selected to form the intermediate layer 2, with platinum precipitated thereon. The intermediate layer 2 is connected to an electric power source so that when electric currents flow therethrough, thermal buckling can be generated to provide power. The intermediate layer 2 has a valve nozzle 24 having a lower rim as shown in FIG. 2, in which precipitated nickel, high polymer material or silicon, etc., can be used to form a valve seat 25 of excellent sealing effects. Alternatively, as shown in FIG. 2A, the intermediate layer 2 directly extends downwardly to form the valve seat 25. The bottom rim of the valve seat 25 can also be a curved surface or a planar surface as shown in FIG. 2. Glass material can be considered to form the lower layer 3.

Figure 1A:
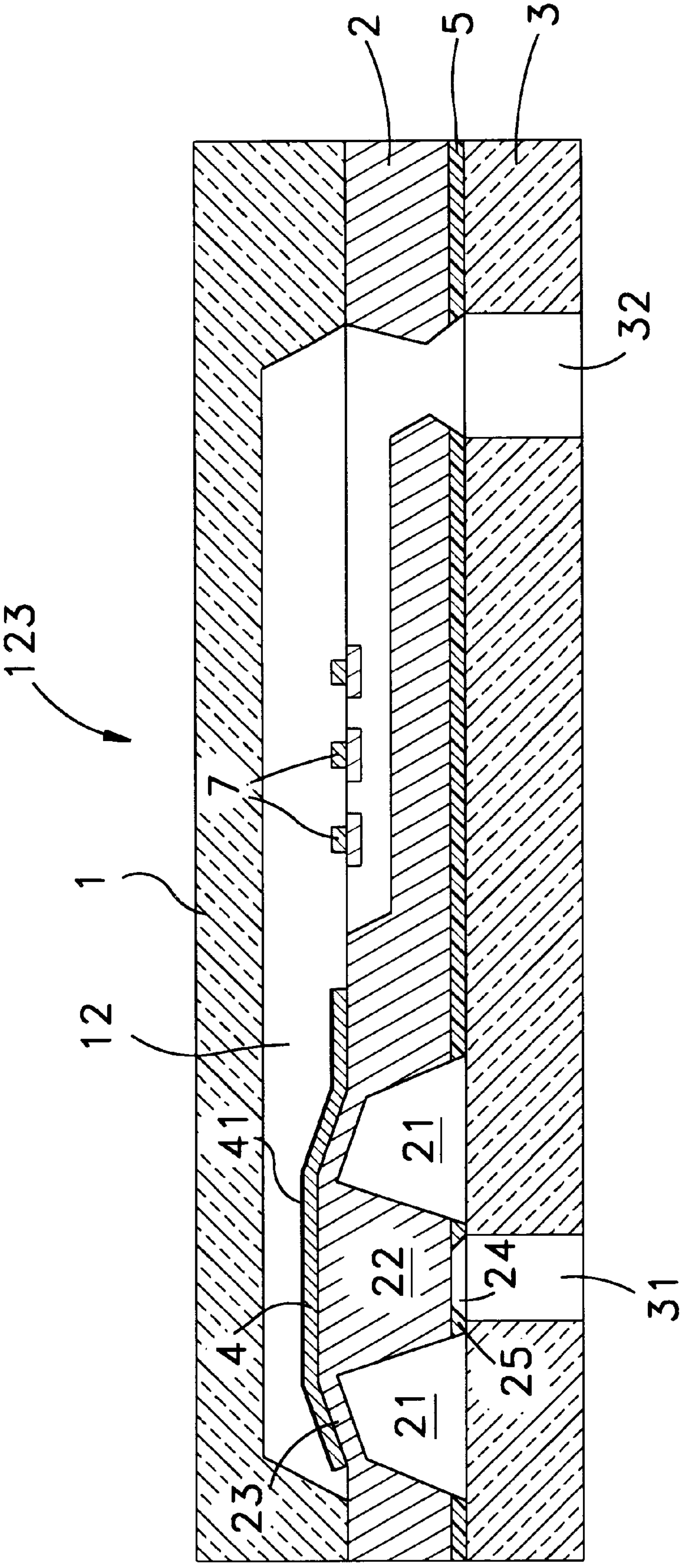
FIG. 1A is similar to FIG. 1, but showing another embodiment of the upper layer.
Figure 4:
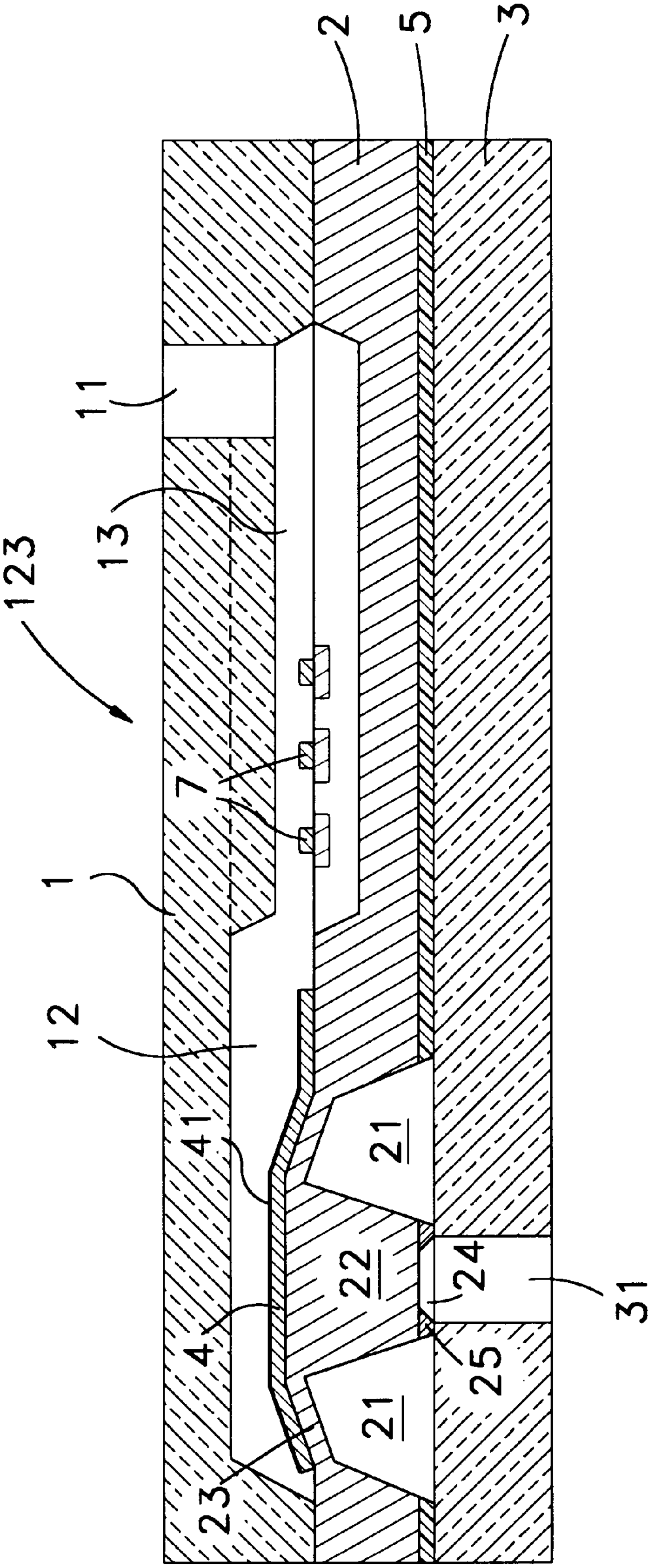
FIG. 4 is similar to FIG. 1, but showing a second preferred embodiment.

Fluid enters from an inlet 32 of the lower layer 3 or an inlet 11 of the upper layer 1 as shown in FIG. 4, past a flow sensing unit 7 and a fluid channel, such as a microflow channel 13 shown in FIG. 1 or 4, to a pressure chamber 12. Referring to FIG. 1A, the effects of the above-described embodiments can also be achieved by directly coupling the inlet 11 of the upper layer 1 to the pressure chamber 12 without the special arrangement of a microflow channel 13. When there is no supply of electric currents, the microvalve is closed. But when there is supply of electric currents, by means of thermal buckling on an electric heating film 4, the suspension 22 and the microbridge structure 23 in the microvalve zone deflect, opening the valve nozzle 24 so that the fluid flows out via the outlet 31 of the lower layer 3, and the flow sensing unit 7 emits a signal to the control unit which controls the amount of electric currents supplied to the intermediate layer 3 to adjust the extent of the opening of the valve nozzle 24.

A preferred embodiment of the present invention comprises an upper layer 1, having a first end and a second end, the first end having a pressure chamber 12 which communicates with the second end via a microflow channel 13; an intermediate layer 2, tightly coupled to a lower rim of the upper layer 1 and having a first end which has a lower portion provided with a semi-closed pressure distribution chamber 21 communicating with the pressure chamber 12 (see FIG. 2), the pressure distribution chamber 21 further having a valve nozzle 24 preferably disposed at a central region thereof; A part of the first end of the intermediate layer 2 forms a mesa suspension by precipitation and etching, which is located at an upper region of the valve nozzle 24. The suspension 22 at least has two sides respectively provided with a microbridge structure 23 formed by precipitation or etching, the suspension 22 having a thermally-driven element, such as an electric heating film 4 coated with a protective film 41 and connected to a terminal 42 in FIG. 3, laid on an upper rim thereof. The terminals 42, 43 shown in FIG. 3 are both connected to a control circuit; and a lower layer 3 tightly coupled to a lower rim of the intermediate layer 2 with an insulating film 5 disposed therebetween, the lower layer 3 having a first end and a second end, one of which is provided with a fluid outlet 31 which communicates with the pressure distribution chamber 21 via the valve nozzle 24. The microflow channel 13 forms a microflow sensing unit 7 by precipitation or etching. The sensing unit 7 is formed when the upper rim of the intermediate layer 2 and the mesa suspension 22 and the microbridge structure 23 are formed by precipitation and etching. Besides, the sensing unit 7 reflect the change in resistance via thermally resistant material so as to sense the amount of flow.

FIG. 3 shows that the sensing unit 7 comprises three sensors made by integration process. Each sensor has a width preferably about 0.03 mm to 0.2 mm. The clearance between two adjacent sensors is preferably about 0.06 mm to 10 mm. Power is supplied to the sensor in the middle. When fluid flows, the temperatures detected by the sensors upstream and downstream of the middle sensor will be different. In other words, they will output different resistance values via the terminals 43 to the control circuit (not shown). The flow values obtained can be used as a parameter of the electric current flow to be supplied to the film 4 in the microvalve zone.

If there is only one set of sensor (not shown), the change in amount of power supplied can be used as a basis for detection, because the greater the flow of fluid, the greater the amount of electric currents needed to heat the flow sensor.

Figure 6:
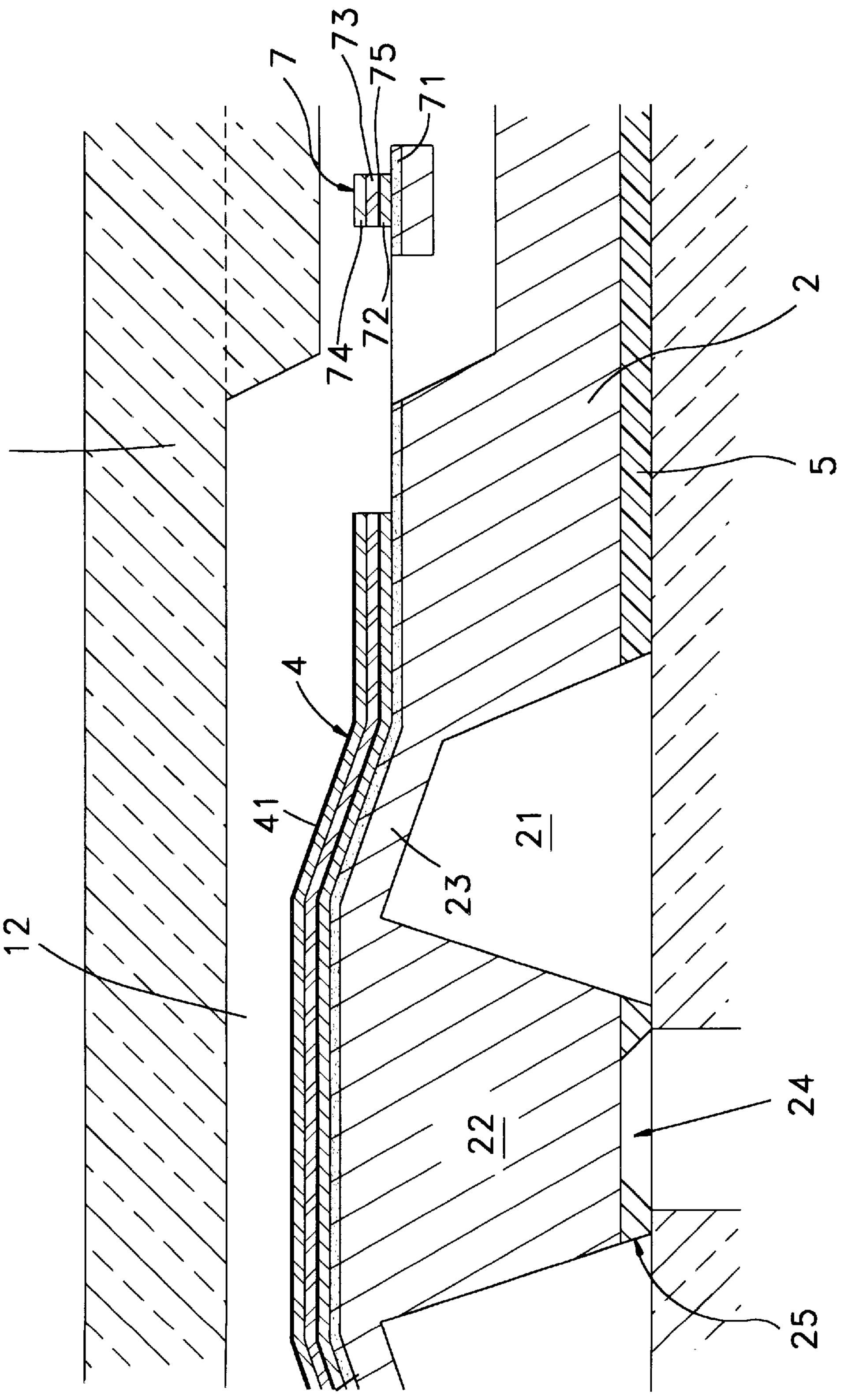
FIG. 6 is an enlarged view of FIG. 1 in part, showing the precipitated films of the sensing unit.

Whatever modes the embodiments of the present invention may have, the sensing unit 7 is made by integration process (the subject of another patent application) to constitute both the microbridge structure 23 and the sensing unit 7. As shown in FIG. 6, the sensing unit 7 is synchronously made with the microvalve zone, constructing in sequence the film layers of a boron layer 71, a silicone oxide ($SiO_2$) layer 72, a platinum layer 73, and a silicon nitride ($Si_3N_4$) layer 74. An Titanium or chrome connecting layer is usually precipitated between the silicon oxide layer 72 and the platinum layer 73. The boron layer 71 is preferably formed by expanding the surface of the silicon middle layer downwardly and can be replaced by other materials such as precipitated layers of silicon nitride, silicon oxide, or polyamide. Besides, the platinum layer 73 may be replaced by a polysilicon layer or other suitable material.

Another feasible embodiment is shown in FIG. 4, in which the position of the inlet is changed. In other words, the inlet located at the lower layer 3 in the embodiment shown in FIG. 1 is shifted to the upper layer 1 and designated by the reference numeral 11.

In order that the suspension 22 of the microvalve unit has a slightly arched configuration, a silicon oxide layer or high polymer layer may be precipitated on the valve nozzle 24 by precipitation or etching during formation of the bottom rim of the intermediate layer 2, and the precipitated layer is then etched to achieve a slightly projecting valve nozzle.

Figure 5:
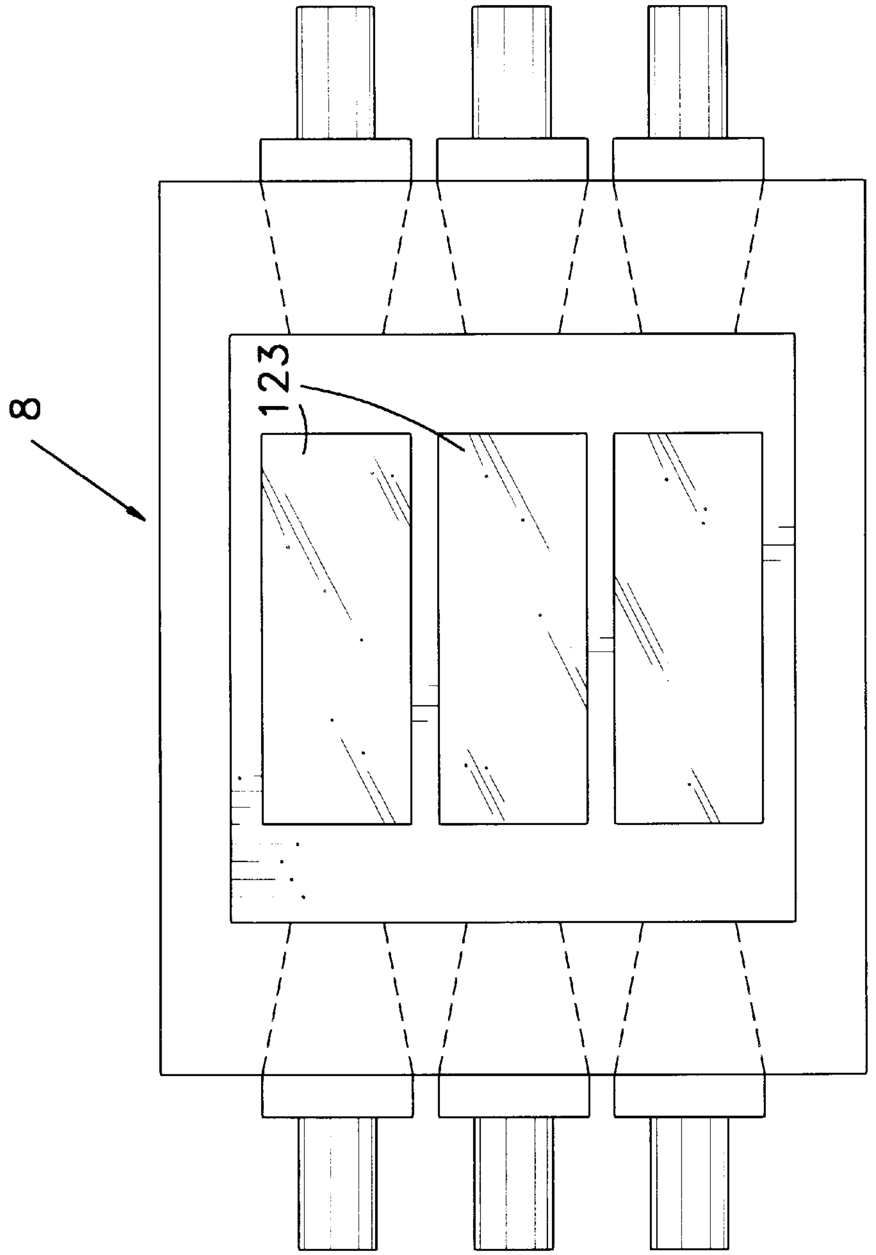
FIG. 5 is a plan view of an embodiment in which a plurality of modules are utilized.

The module 123 of the present invention can be used alone, or, as shown in FIG. 5, a plurality of modules 123 are utilized to form a flow control assembly 8 or to enable large fluid flows.

The module of the present invention has the following practical effects: 1. The use of films and silicon etching technique enables batch production, low costs, and compactness. 2. The integrated microvalve element and the flow sensing elements, through the use of coupling technique, achieve a three-layered structure which forms an integrated microflow control system module. Compared to conventional mass flow controllers, the entire system is compact in size, easy to assemble, and provides enhanced reliability. 3. The microstructure of the microvalve zone is proportional to the external voltages so that it has the functions of a proportional valve. Additionally, the microstructure of the silicon chip provides more stable mechanical characteristics to considerably enhance reliability and precision. 4. The microvalve utilizes thermally-driven methods such as thermal buckling or bimetal to provide greater drive deflection and require smaller drive voltages as compared to the use of other driving method. 5. The suspension of the flow sensing zone minimizes the interference factor of heat conduction, since the signal generated thereby completely comes from the heat convection effect caused by fluid flow. 6. As the suspension of the flow sensing zone is restricted in the small fluid channel, the flow of fluid will not be excessive as to become a turbulence which will interfere with the signals.

Although the present invention has been illustrated and described with reference to the preferred embodiment thereof, it should be understood that it is in no way limited to the details of such embodiment but is capable of numerous modifications within the scope of the appended claims.

What is claimed is:

1. An integrated micro thermister flow control module, comprising:

an upper layer, having a first end and a second end, said first end having a pressure chamber, and said second end being in communication with an inlet;

an intermediate layer, tightly coupled to a lower rim of said intermediate layer having a first end with a lower portion provided with a semi-closed pressure distribution chamber, said pressure distribution chamber communicating with said pressure chamber of said upper layer, a valve nozzle being disposed in said pressure distribution chamber, said first end of said intermediate layer having a mesa suspension which is located at an upper region of said valve nozzle, said suspension having thermally-driven elements disposed thereon, and at least two portions of said suspension being provided with a microbridge structure; and a lower layer, tightly coupled to a lower rim of said intermediate layer and having a first end and a second end, one of said ends being provided with a fluid outlet which communicates with said pressure distribution chamber via said valve nozzle;

said pressure chamber being coupled to one side of said inlet where a microflow sensing unit is disposed, said sensing unit reflecting the change in resistance using thermally resistant material to detect the amount of fluid flow.

2. The integrated micro thermister flow control module defined in claim 1, wherein said valve nozzle has a downwardly projecting valve seat which extends from a bottom rim of said suspension, said valve seat being tightly coupled to said lower layer such that said suspension arches upwardly.

3. The integrated micro thermister flow control module defined in claim 1, wherein said second end of said upper layer is provided with said inlet for guiding fluid into said pressure chamber.

4. The integrated micro thermister flow control module defined in claim 1, wherein said second end of said lower layer is provided with said inlet for guiding fluid into said pressure chamber.

5. The integrated micro thermister flow control module defined in claim 1, wherein said thermally-driven elements disposed on said suspension comprise an electric heating film provided on an upper rim of said suspension for generating thermal buckling deflection when said intermediate layer is supplied with electric currents.

6. The integrated micro thermister flow control module defined in claim 1, wherein said sensing unit comprises precipitated film layers which are, in sequence, a diffused boron layer, a silicon layer, a platinum layer, and a silicon nitride layer.

7. The integrated micro thermister flow control module defined in claim 1, wherein said sensing unit comprises a sensor.

8. The integrated micro thermister flow control module defined in claim 1, wherein said sensing unit comprises a plurality of sensors.

9. The integrated micro thermister flow control module defined in claim 1, wherein said sensing unit comprises precipitated film layers which are, in sequence, a precipitated silicon nitride layer, a silicon layer, a platinum layer, and a silicon nitride layer.

10. The integrated micro thermister flow control module defined in claim 1, wherein said sensing unit comprises precipitated film layers which are, in sequence, a silicon nitride layer, a silicon oxide layer, a silicon layer, a platinum layer, and a silicon nitride layer.

11. The integrated micro thermister flow control module defined in claim 1, wherein said sensing unit comprises precipitated film layers which are, in sequence, a polyamide layer, a silicon layer, a platinum layer, and a silicon nitride layer.

12. The integrated micro thermister flow control module defined in claim 1, wherein said suspension is diffused with a boron layer thereon, and said thermally-driven elements comprise precipitated layers which are, in sequence, a silicon oxide layer, a platinum layer, and a silicon nitride layer on said boron layer.

13. The integrated micro thermister flow control module defined in claim 1, wherein said suspension is diffused with a precipitated silicon nitride layer thereon, and said thermally-driven elements are comprised of precipitated layers which are, in sequence, a silicon oxide layer, a platinum layer, and a silicon nitride layer on said boron layer.

14. The integrated micro thermister flow control module defined in claim 1, wherein said suspension is diffused with a precipitated multi-layered structure of silicon nitride and silicon oxide, and said thermally-driven elements comprise precipitated layers which are, in sequence, a silicon oxide layer, a platinum layer, and a silicon nitride layer on said precipitated multi-layered structure of silicon nitride and silicon oxide.

15. The integrated micro thermister flow control module defined in claim 1, wherein said suspension is diffused with a precipitated polyamide layer, and said thermally-driven elements comprise precipitated layers which are, in sequence, a silicon oxide layer, a platinum layer, and a silicon nitride layer on said precipitated multi-layered structure of a precipitated polyamide layer.

16. The integrated micro thermister flow control module defined in claim 6, wherein antimony is precipitated between said silicon oxide layer and said platinum layer of said sensing layer.

17. The integrated micro thermister flow control module defined in claim 6, wherein chrome is precipitated between said silicon oxide layer and said platinum layer of said sensing layer.

18. The integrated micro thermister flow control module defined in claim 6, wherein a connecting layer is precipitated between said silicon oxide layer and said platinum layer of said sensing layer.

19. The integrated micro thermister flow control module defined in claim 12, wherein antimony is precipitated between said silicon oxide layer and said platinum layer of said thermally-driven elements.

20. The integrated micro thermister flow control module defined in claim 12, wherein chrome is precipitated between said silicon oxide layer and said platinum layer of said thermally-driven elements.

21. The integrated micro thermister flow control module defined in claim 12, wherein a connecting layer is precipitated between said silicon oxide layer and said platinum layer of said thermally-driven elements.

22. The integrated micro thermister flow control module defined in claim 8, wherein a clearance between two adjacent sensors is in the range of 0.06 mm to 10 mm.

23. The integrated micro thermister flow control module defined in claim 8, wherein a width of each sensor is in the range of 0.03 mm to 0.2 mm.

24. The integrated micro thermister flow control module defined in claim 2, wherein said valve seat comprises a film precipitated at the lower rim of said valve nozzle.

25. The integrated micro thermister flow control module defined in claim 8, wherein said valve seat comprises a downward extension from said valve nozzle.

26. The integrated micro thermister flow control module defined in claim 1, wherein said sensing unit comprises precipitated film layers which are, in sequence, a diffused boron layer, a silicon layer, a polysilicon layer, and a silicon nitride layer.

27. The integrated micro thermister flow control module defined in claim 1, wherein said sensing unit comprises precipitated film layers which are, in sequence, a diffused boron layer, a silicon layer, a tungsten (W) layer, and a silicon nitride layer.

28. The integrated micro thermister flow control module defined in claim 3, wherein said pressure chamber communicates with said inlet via a microflow channel.

29. The integrated micro thermister flow control module defined in claim 4, wherein said pressure chamber communicates with said inlet via a microflow channel.

* * * * *